(12) United States Patent
Chen et al.

(10) Patent No.: US 10,852,476 B2
(45) Date of Patent: Dec. 1, 2020

(54) SEMICONDUCTOR PACKAGE, INTEGRATED OPTICAL COMMUNICATION SYSTEM AND MANUFACTURING METHOD OF INTEGRATED OPTICAL COMMUNICATION SYSTEM

(71) Applicant: Taiwan Semiconductor Manufacturing Co., Ltd., Hsinchu (TW)

(72) Inventors: Chih-Hao Chen, Hsinchu (TW); Chin-Fu Kao, Taipei (TW); Li-Hui Cheng, New Taipei (TW); Szu-Wei Lu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/285,234

(22) Filed: Feb. 26, 2019

(65) Prior Publication Data

US 2020/0271860 A1  Aug. 27, 2020

(51) Int. Cl.
*G02B 6/12* (2006.01)
*G02B 6/43* (2006.01)
*G02B 6/30* (2006.01)
*G02B 6/122* (2006.01)

(52) U.S. Cl.
CPC ....... *G02B 6/12004* (2013.01); *G02B 6/1228* (2013.01); *G02B 6/30* (2013.01); *G02B 6/43* (2013.01)

(58) Field of Classification Search
CPC ................................................. G02B 6/12004
See application file for complete search history.

(56) References Cited

U.S. PATENT DOCUMENTS

| | | | |
|---|---|---|---|
| 8,831,437 B2 * | 9/2014 | Dobbelaere | H01L 21/84 398/164 |
| 2006/0182397 A1 * | 8/2006 | Benner | G02B 6/4212 385/89 |
| 2016/0359568 A1 * | 12/2016 | De Dobbelaere | G02B 6/4279 |
| 2017/0299809 A1 * | 10/2017 | Boeuf | H02S 40/44 |
| 2019/0004247 A1 * | 1/2019 | Huang | G02B 6/12004 |
| 2019/0243167 A1 * | 8/2019 | Menezo | G02F 1/2257 |
| 2019/0250327 A1 * | 8/2019 | Huang | G02B 6/12002 |

* cited by examiner

*Primary Examiner* — Sung H Pak
(74) *Attorney, Agent, or Firm* — JCIPRNET

(57) ABSTRACT

A semiconductor package includes a photonic integrated circuit, an encapsulating material, and a redistribution structure. The photonic integrated circuit includes a coupling surface, a back surface opposite to the coupling surface and a plurality of optical couplers disposed on the coupling surface and configured to be coupled to a plurality of optical fibers. The encapsulating material encapsulates the photonic integrated circuit and revealing the plurality of optical couplers. The redistribution structure is disposed over the encapsulating material and the back surface of the photonic integrated circuit, wherein the redistribution structure is electrically connected to the photonic integrated circuit.

20 Claims, 8 Drawing Sheets

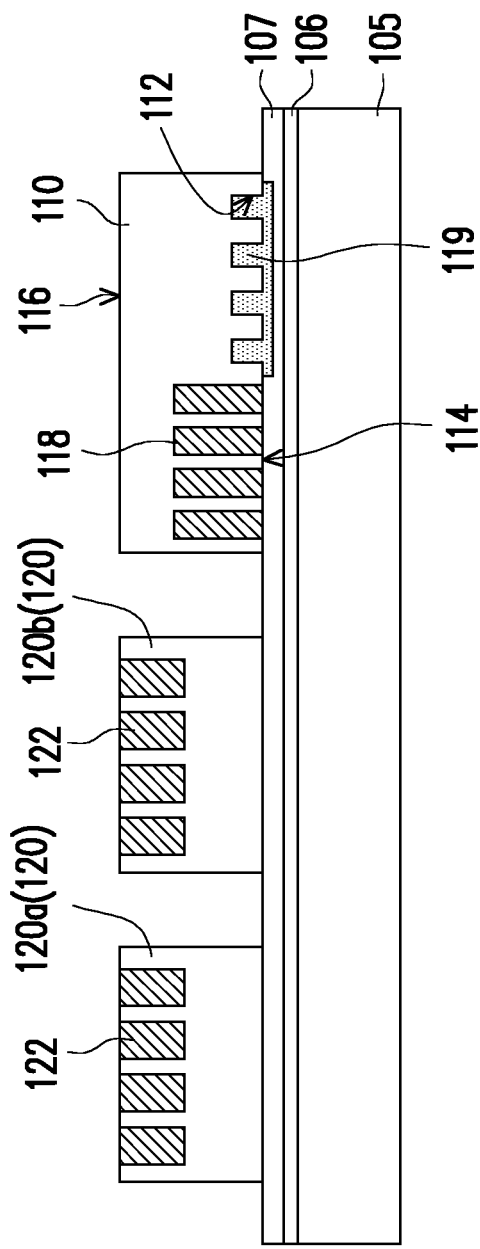
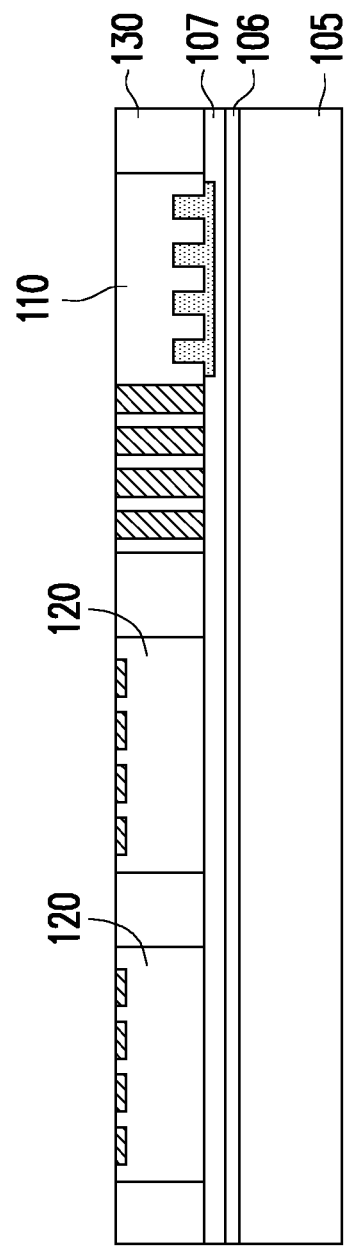
FIG. 3
FIG. 4

SEMICONDUCTOR PACKAGE, INTEGRATED OPTICAL COMMUNICATION SYSTEM AND MANUFACTURING METHOD OF INTEGRATED OPTICAL COMMUNICATION SYSTEM

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links. However, contemporary optical communication systems are expensive and complicated in manufacturing process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 to FIG. 9 illustrate cross sectional views of intermediate stages in the manufacturing of an integrated optical communication system according to some exemplary embodiments of the present disclosure.

DETAILED DESCRIPTION

Figure 1:
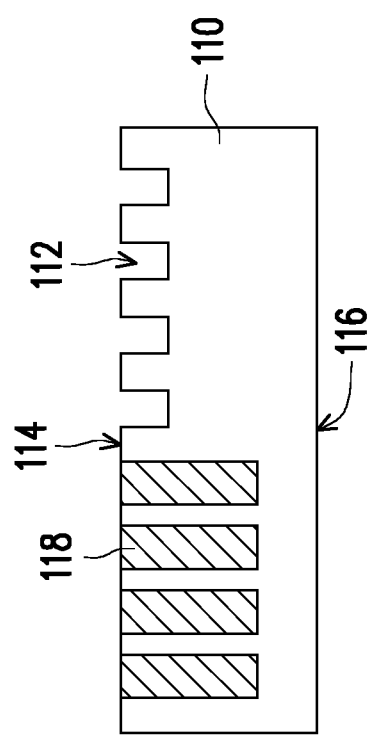

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 to FIG. 9 illustrate cross sectional views of intermediate stages in the manufacturing of an integrated optical communication system according to some exemplary embodiments of the present disclosure. In some embodiments, a manufacturing method of an integrated optical communication system may include the following steps. With now reference to FIG. 1 to FIG. 3, a photonic integrated circuit 110 is provided on a carrier 105. In some exemplary embodiments, at least one electronic integrated circuit 120 (two electronic integrated circuits 120a and 120b are illustrated, but not limited thereto) may also be provided on the carrier 105 as it is shown in FIG. 3. In some embodiments, the photonic integrated circuit 110 and the electronic integrated circuits 120a and 120b are disposed in a side by side manner.

In some embodiments, optical signals are communicated between optical and optoelectronic devices via optical waveguides fabricated in the photonic integrated circuit 110. Optical and optoelectronic devices are integrated in photonic integrated circuit 110 while electronic devices are integrated into one or more electronic integrated circuits 120 that are coupled to the photonic integrated circuit 110. In some embodiments, the photonic integrated circuit 110 includes a plurality of optical couplers 112 disposed on a coupling surface 114 of the photonic integrated circuit 110. The optical couplers 112 face the carrier 105 and are covered by a protection film 119. In some embodiment, the optical couplers 112 are configured for coupling of light into and out of the photonic integrated circuit 110. The optical couplers 112 may be utilized to couple light received from optical fibers (e.g. the optical fibers 160 illustrated in FIG. 10) into the photonic integrated circuit 110. The optical couplers 112 may be utilized to couple light from the photonic integrated circuit 110 into optical fibers (optical I/O).

In the present embodiment, the optical couplers 112 may be grating couplers, which include a plurality of grooves parallel to one another, but the disclosure is not limited thereto. The optical fibers may be coupled, for example, to a CMOS chip, and may be aligned at an angle substantially normal to the surface of the photonic integrated circuit 110 to optimize coupling efficiency, for example. In an alternative embodiment, the optical couplers may be edge couplers, which include a plurality of grooves parallel to one another and extended to an edge of the coupling surface 114 of the photonic integrated circuit 110, and are configured for coupling of light between planar waveguide circuits and optical fibers. The disclosure is not limited thereto.

Figure 2:
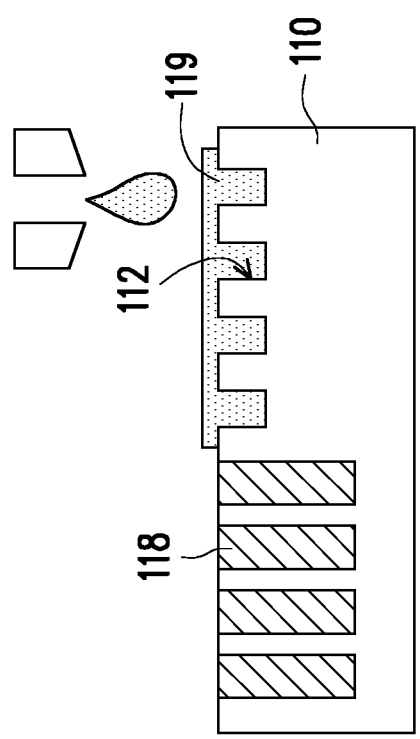

In accordance with some embodiments of the disclosure, the optical couplers 112 may be formed by an etching process, such as a wet etching process or a dry etching process as it is shown in FIG. 1. The disclosure is not limited thereto. In some embodiments, the protection film 119 may be dispensed on the optical couplers 112 for covering and protecting the optical couplers 112 as it is shown in FIG. 2. Accordingly, with the protection provided by the protection film 119, issues of air bulge occurred in the optical couplers 112 due to sequential high-vacuum processes such as a physical vapor deposition (PVD) process, a chemical vapor deposition (CVD) process, etc., can be avoided. In some embodiments, material of the protection film 119 may include epoxy, acrylic base material, polyimide, or the like, for example.

In some embodiments, optical structures may be grown, deposited or formed over a substrate in the photonic integrated circuit 110. These optical structures may be connected by waveguides and may themselves include waveguide structures. The waveguides and structure may be formed via techniques involving chemical vapor deposition, physical vapor deposition, epitaxial deposition, sputtering, etching, photolithography, spin coating, screen printing, injection molding, stamping, or other physical processing techniques. A number of these techniques, such as CVD or other epitaxial growth can be self-aligned to the optical couplers 112.

In accordance with some embodiments of the disclosure, the photonic integrated circuit 110 may include a CMOS chip with active and passive optical devices such as waveguides, modulators, photodetectors, optical couplers 112, combiners, etc. The functionalities supported by the photonic integrated circuit 110 may include photo-detection, optical modulation, optical routing, and optical interfaces for high-speed I/O and optical power delivery. The photonic integrated circuit 110 may further include a plurality of through vias (through silicon vias, TSV) 118 extending through the photonic integrated circuit 110 for coupling the electronic integrated circuits 120 through a redistribution structure (e.g. the redistribution structure 140 shown in FIG. 5). In some embodiments, the through vias 118 may not be extended all the way through the photonic integrated circuit 110, but rather extended from the coupling surface 114 toward the back surface of the photonic integrated circuit 110. The optical couplers 112 is configured for coupling light into the photonic integrated circuit 110 from an optical device and into/out of the photonic integrated circuit 110 via optical fibers (optical I/O) 160. Optical interfaces may also be facilitated by an optical epoxy, providing both optical transparency and mechanical fixation.

In accordance with some embodiments of the disclosure, the electronic integrated circuit 120 may include one or more electronic complementary metal-oxide-semiconductor (CMOS) chips that provide the required electronic functions of the integrated optical communication system 100. The electronic integrated circuits 120 may include a single chip or a plurality of die coupled to the photonic integrated circuit 110 via the redistribution structure (e.g. the redistribution structure 140 shown in FIG. 5). The electronic integrated circuits 120 may include trans-impedance amplifiers (TIAs), low-noise amplifiers (LNAs), and control circuits for processing optical signals in the photonic integrated circuit 110. For example, the electronic integrated circuits 120 may include a driver circuitry for controlling optical modulators in the photonic integrated circuit 110 and variable gain amplifiers for amplifying electrical signals received from photodetectors in the photonic integrated circuit 110. By incorporating photonics devices in the photonic integrated circuit 110 and electronic devices in the electronic integrated circuits 120, the CMOS processes for each chip may be optimized for the type of devices incorporated.

In some embodiments, one of the electronic integrated circuits 120 (electronic integrated circuits 120*a*, for example) may include an application specific integrated circuit (ASIC) and another one of the electronic integrated circuits 120 (electronic integrated circuits 120*b*, for example) may include a driver die with circuitry for driving the photonics devices in the photonic integrated circuit 110. Accordingly, the driver die may receive electronic signals from the ASIC 120*a* via the photonic integrated circuit 110 and use the received signals to subsequently drive photonic devices in the photonic integrated circuit 110. In this manner, the driver die 120*b* provides the driver circuitry as opposed to integrating driver circuitry in the ASIC 120*a*. However, the exemplary embodiment is not intended to limit the disclosure.

With now reference to FIG. 3, in accordance with some embodiments of the disclosure, the photonic integrated circuit 110 and the electronic integrated circuits 120 are placed on the carrier 105, which includes an adhesive layer 106 disposed on the carrier 105. In some embodiments, the carrier 105 may be a glass carrier, a ceramic carrier, or the like. The adhesive layer 106 may be a light to heat conversion release coating (LTHC), or the like. In some embodiments, a die attach film (DAF) 107 may also be disposed on the carrier 105, or on the adhesive layer 106 (if any) for attaching the photonic integrated circuit 110 and the electronic integrated circuits 120 on the carrier 105.

In some embodiments, the photonic integrated circuit 110 may be disposed on the carrier 105 with the coupling surface 114, where the optical couplers 112 is disposed, facing the carrier 105. The protection film 119 covering the optical couplers 112 may be partially embedded in the die attach film 107. The back surface of the photonic integrated circuit 110 opposite to the coupling surface 114 faces away from the carrier 105. In some embodiments, active surfaces of the electronic integrated circuits 120 where electrical terminals 122 are disposed may face away from the carrier 105 as it is shown in FIG. 3. However, the exemplary embodiment is not intended to limit the disclosure.

In some embodiments, the carrier 105 may include a plurality of die areas arranged in, for example, an array manner. Accordingly, a plurality of sets of the photonic integrated circuit 110 and the electronic integrated circuits 120 may be disposed on the die areas respectively. With such arrangement, a plurality of integrated optical communication systems can be formed concurrently. For the sake of brevity and clarity, the manufacturing process of one of the integrated optical communication system (e.g. the integrated optical communication system 100 illustrated in FIG. 9) is illustrated in FIG. 1 to FIG. 9.

With now reference to FIG. 4, in some embodiments, an encapsulating material 130 is provided on the carrier 105 for encapsulating the photonic integrated circuit 110 and the electronic integrated circuits 120. In some embodiments, the encapsulating material 130 fills the gaps between the photonic integrated circuit 110 and the electronic integrated circuits 120, and may be in contact with the die attach film 107 (if any). The encapsulating material 130 may include a molding compound, an epoxy, or a resin, etc. In some embodiments, a top surface of the encapsulating material 130 may be higher than the back surface 116 of the photonic integrated circuit 110 and the active surfaces of the electronic integrated circuits 120. Namely, the encapsulating material 130 covers the back surface 116 of the photonic integrated circuit 110 and the electrical terminals 122 of the electronic integrated circuits 120.

Then, a thinning process, which may be a grinding process, is performed to thin the encapsulating material 130 until the top ends of the through vias 118 of the photonic integrated circuit 110 and the top surfaces of the electrical terminals 122 of the electronic integrated circuits 120 are revealed. The resulting structure is shown in FIG. 4. Due to the thinning process, the back surface 116 of the photonic integrated circuit 110 and the active surfaces of the electronic integrated circuits 120 are substantially level with the top surface of the encapsulating material 130 after being ground. In addition, the through vias 118 extend through the photonic integrated circuit 110 for electrically connecting the coupling surface 114 and the back surface 116 of the photonic integrated circuit 110. Throughout the description, the resultant structure including the photonic integrated circuit 110, the electronic integrated circuits 120 and the encapsulating material 130 as shown in FIG. 4 may have a wafer form in the process.

Figure 5:
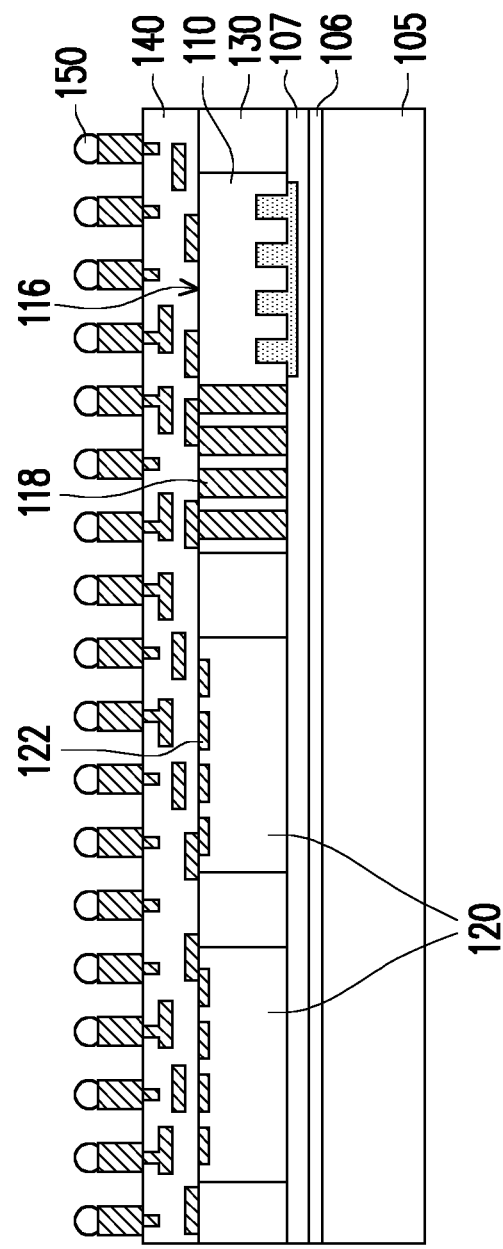

With now reference to FIG. 5, a redistribution structure 140 is provided over the encapsulating material 130, the back surface 116 of the photonic integrated circuit 110 and the active surfaces of the electronic integrated circuits 120. The redistribution structure 140 is located at a side opposite to the optical couplers 112 and is electrically connected to the photonic integrated circuit 110 and the electronic integrated circuits 120. That is to say, the photonic integrated circuit 110 and the electronic integrated circuits 120 are coupled to one another through the redistribution structure 140. In some embodiments, the redistribution structure 140 may also interconnect the through vias 118 and the electrical terminals 122. The redistribution structure 140 may be formed by, for example, depositing conductive layers, patterning the conductive layers to form redistribution circuits, partially covering the redistribution circuits and filling the gaps between the redistribution circuits with dielectric layers, etc. The material of the redistribution circuits may include a metal or a metal alloy including aluminum, copper, tungsten, and/or alloys thereof. The dielectric layers may be formed of dielectric materials such as oxides, nitrides, carbides, carbon nitrides, combinations thereof, and/or multi-layers thereof. The redistribution circuits are formed in the dielectric layers and electrically connected to the photonic integrated circuit 110 and the electronic integrated circuits 120. In addition, an Under Bump Metallurgy (UBM) layer may be formed on the redistribution structure by sputtering, evaporation, or electroless plating, etc.

In accordance with some embodiments of the disclosure, a plurality of conductive balls 150 are mounted on the redistribution structure 140 in accordance with some exemplary embodiments. The formation of the conductive balls 150 may include placing solder balls on the redistribution structure 140 or on the UBM layer (if any), and then reflowing the solder balls. In alternative embodiments, the formation of the conductive balls 150 may include performing a plating process to form solder regions on the redistribution structure 140 or on the UBM layer (if any), and then reflowing the solder regions. The conductive balls 150 may also include conductive pillars, or conductive pillars with solder caps, which may also be formed through plating. In some embodiments, at least one integrated passive device (IPD) (not shown) may also be mounted on the redistribution structure 140. The IPD may be fabricated using standard wafer fabrication technologies such as thin film and photolithography processing, and may be mounted on the redistribution structure 140 through, for example, flip-chip bonding or wire bonding, etc.

Figure 6:
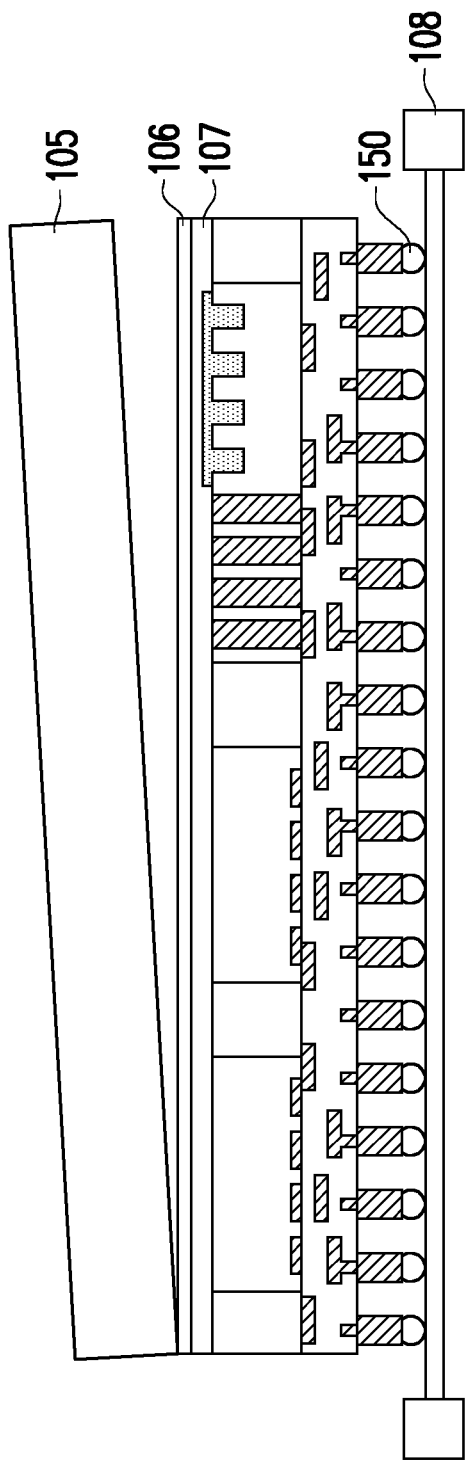
Figure 7:
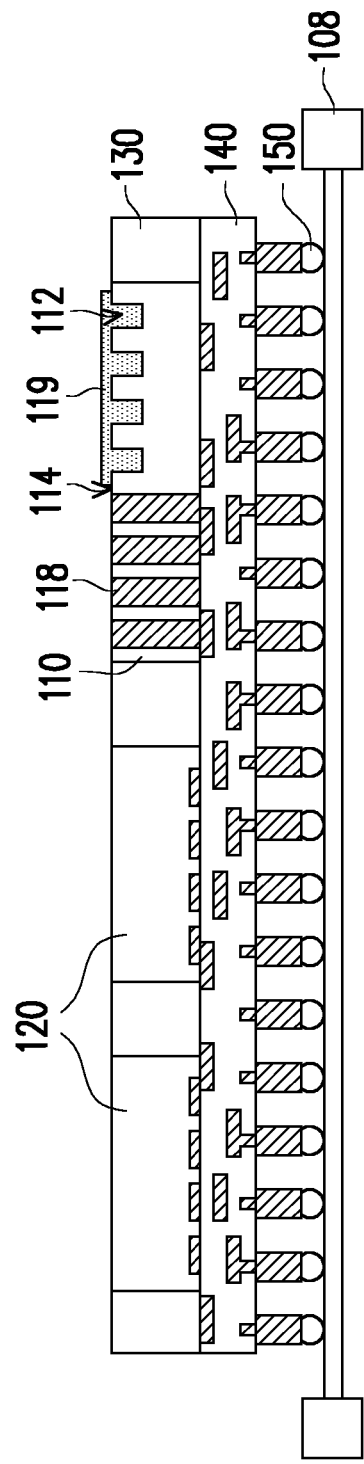

With now reference to FIG. 6 and FIG. 7, the carrier 105 may be removed. In some embodiments, the resultant structure shown in FIG. 5 may firstly be flipped over and mounted on a tape carrier 108 before the carrier 105 is removed. In some embodiments, the resultant structure shown in FIG. 5 is mounted on the tape carrier 108 by disposing the conductive balls 150 on the tape carrier 108. In some embodiments, the carrier 105 is detached from the underlying structure by causing the adhesive layer 106 to lose or reduce adhesion. The carrier 105 is then removed from the adhesive layer 165 as it is shown in FIG. 6. Then, the adhesive layer 106 and the die attach film 107 may be removed. For example, the adhesive layer 106 may be exposed to UV light, so that the adhesive layer 106 loses or reduces adhesion, and hence the carrier 105 can be removed from the adhesive layer 106. In some embodiments, the adhesive layer 165 and the die attach film 107 may be removed along with the carrier 105. After the carrier 105 is removed, the bottom ends of the through vias 118 and the protection film 119 are revealed, and the encapsulating material 130 reveals the optical couplers 112 and the protection film 119. In the illustrated structure in FIG. 7, the coupling surface 114 of the photonic integrated circuit 110 is level with the back surfaces of the electronic integrated circuits 120.

Figure 8:
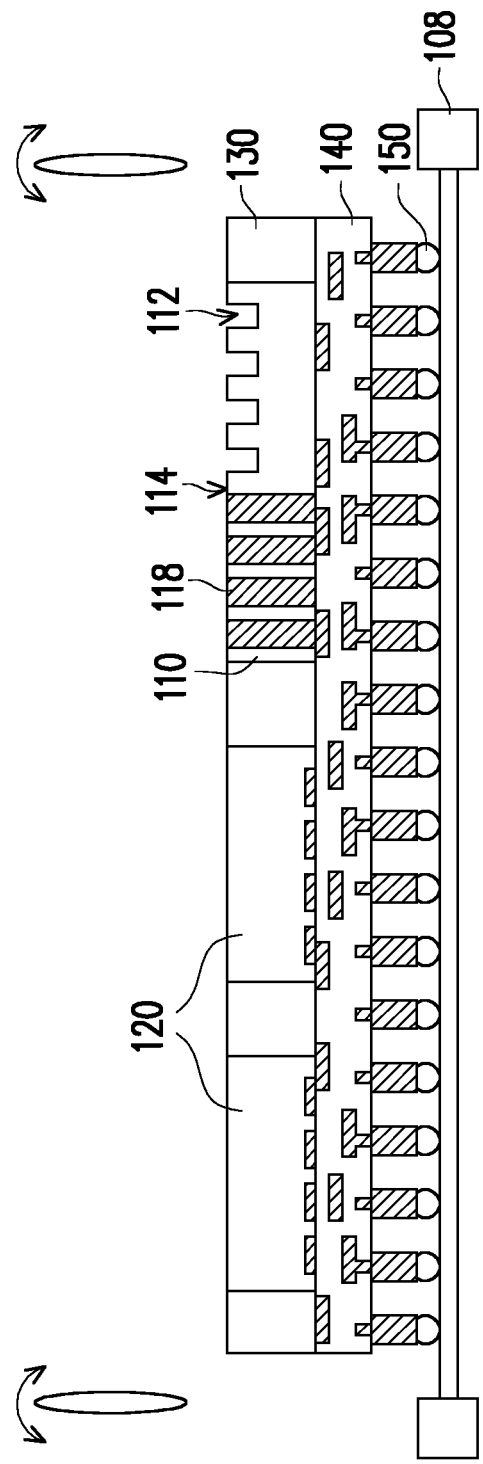

With now reference to FIG. 8, the protection film 119 is removed for revealing the optical couplers 112. In accordance with some embodiments of the disclosure, the protection film 119 can be removed by a thermal process and/or a rinse process. For example, the protection film 119 can be easily removed through a high-temperature thermal process such as a curing process applied for dielectric (passivation) layer curing or encapsulating material curing. In some embodiments, the protection film 119 may be easily rinse off without any residual left on the optical couplers 112.

Figure 9:
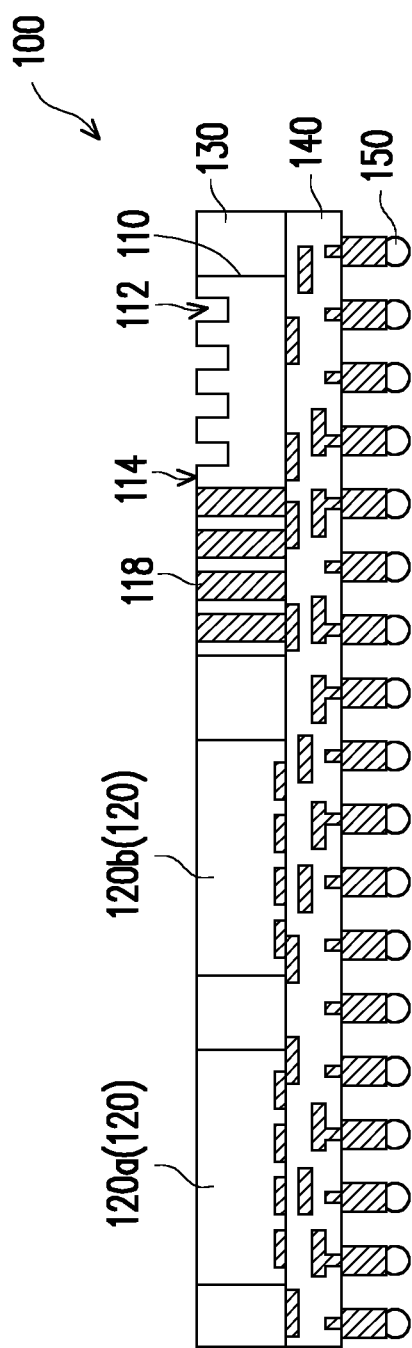

With now reference to FIG. 8 and FIG. 9, in some embodiments, a singularizing process is performed to form a plurality of integrated optical communication systems 100 (one of the integrated optical communication systems 100 is illustrated in FIG. 9). The singularizing process may include a dicing process to saw along a plurality of scribe lines. At the time, the manufacturing process of the integrated optical communication system 100 (or the semiconductor package 100 including one photonic integrated circuit 110) may be substantially done.

Figure 10:
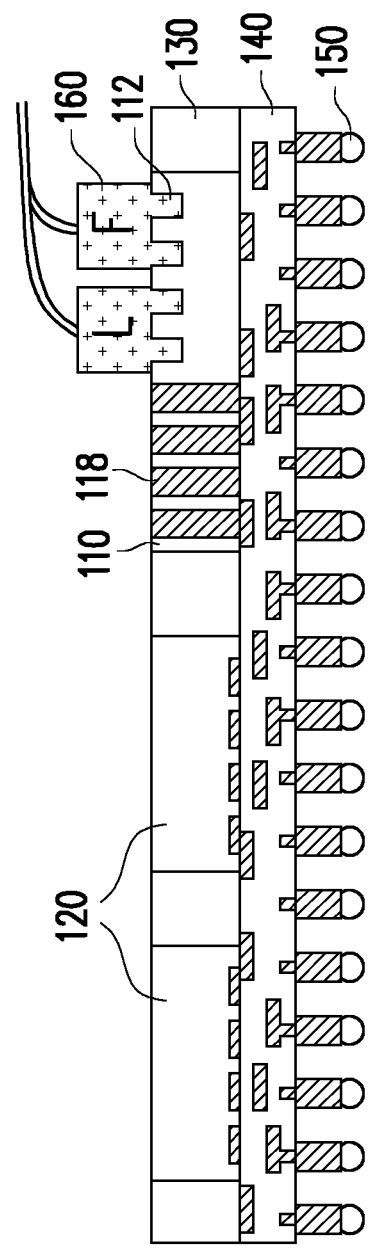
FIG. 10 illustrates a cross sectional view of an integrated optical communication system coupled to optical fibers according to some exemplary embodiments of the present disclosure.

FIG. 10 illustrates a cross sectional view of an integrated optical communication system coupled to optical fibers according to some exemplary embodiments of the present disclosure. With now reference to FIG. 10, in an embodiment of the optical couplers 112 being the grating couplers, the singularizing process is performed on the encapsulating material 130 as shown in FIG. 8. Accordingly, the grating couplers 112 includes a plurality of grooves arranged within an upper surface of the photonic integrated circuit 110 as it is shown in FIG. 10. The optical couplers 112 are configured for coupling light into the photonic integrated circuit 110 from optical device and into/out of the photonic integrated circuit 110 via optical fibers (optical I/O) 160. The optical fibers (optical I/O) 160 may be coupled to the photonic integrated circuit 110, and may be aligned at an angle substantially normal to the surface of the photonic integrated circuit 110 to optimize coupling efficiency, for example.

Figure 11:
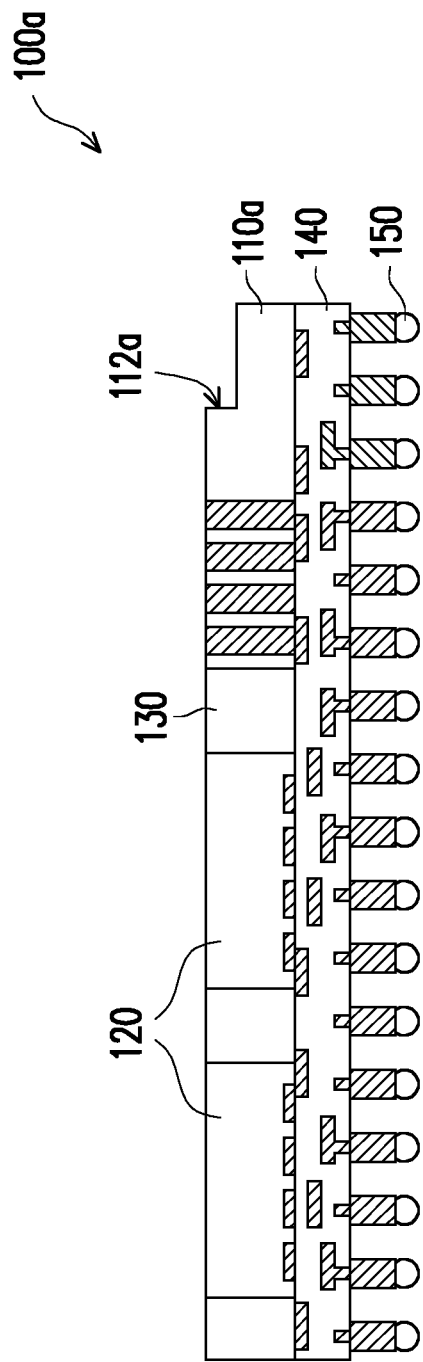
FIG. 11 illustrates a cross sectional view of an integrated optical communication system according to some exemplary embodiments of the present disclosure.
Figure 12:
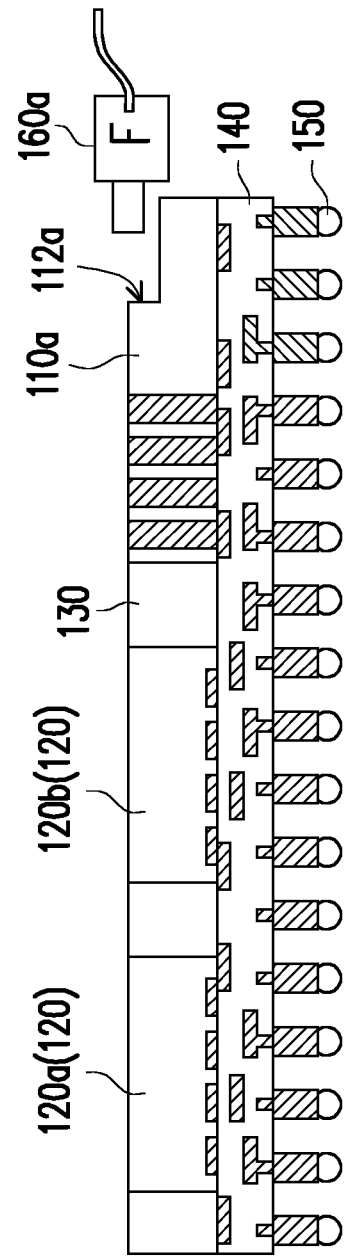
FIG. 12 illustrates a cross sectional view of an integrated optical communication system coupled to optical fibers according to some exemplary embodiments of the present disclosure.
Figure 13:
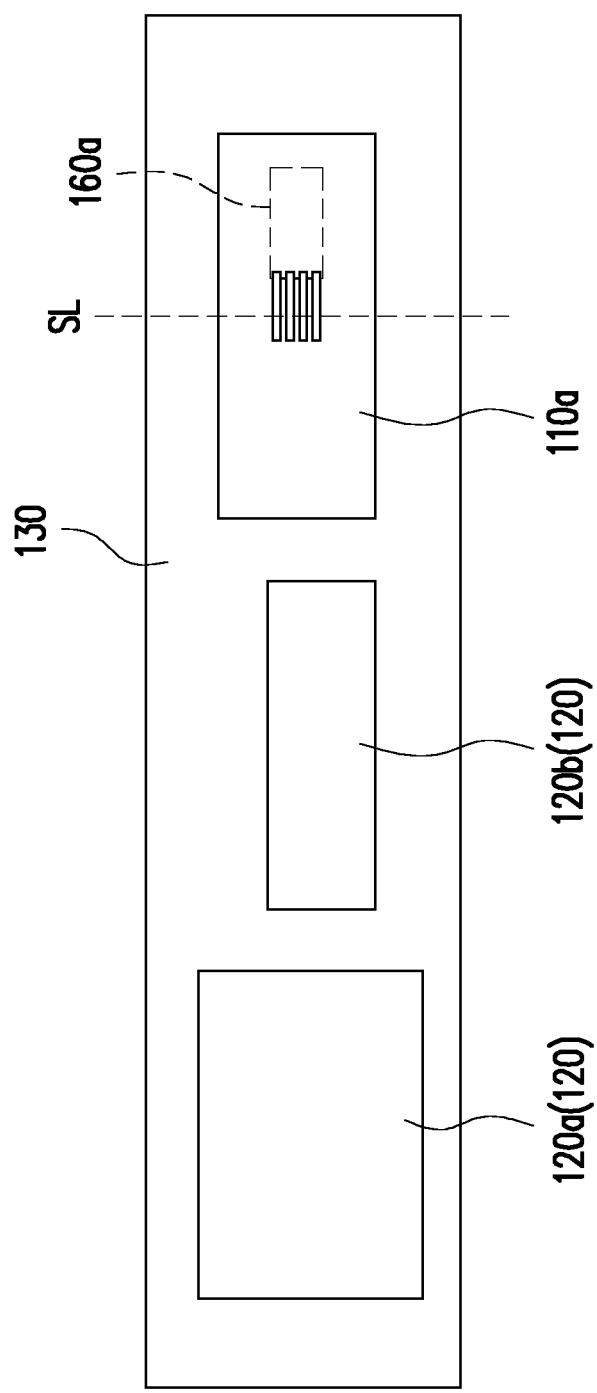
FIG. 13 illustrates a top view of an integrated optical communication system according to some exemplary embodiments of the present disclosure.

FIG. 11 illustrates a cross sectional view of an integrated optical communication system according to some exemplary embodiments of the present disclosure. FIG. 12 illustrates a cross sectional view of an integrated optical communication system coupled to optical fibers according to some exemplary embodiments of the present disclosure. FIG. 13 illustrates a top view of an integrated optical communication system according to some exemplary embodiments of the present disclosure. It is noted that the integrated optical communication system 100a shown in FIG. 11 to FIG. 13 contains many features same as or similar to the integrated optical communication system 100 disclosed earlier with FIG. 9 and FIG. 10. For purpose of clarity and simplicity, detail description of same or similar features may be omitted, and the same or similar reference numbers denote the same or like components. The main differences between the integrated optical communication system 100a shown in FIG. 11 to FIG. 13 and the integrated optical communication system 100 shown in FIG. 9 and FIG. 10 are described as follows.

With now reference to FIG. 11 and FIG. 13, in an embodiment of the optical couplers 112a being edge couplers, the singularizing process is performed on a periphery of the photonic integrated circuit 110a along the scribe line SL as shown in 13. With such arrangement, after the singularizing process, the optical couplers 112a including a plurality of grooves extended toward an edge of the photonic integrated circuit 110a is partially cut and extended to an edge of an upper surface of the photonic integrated circuit 110a as shown in FIG. 11. In other words, the optical couplers 112a may be extended to anywhere overlapping the scribe line SL, so after cutting along the scribe line SL, a bottom surface of the optical couplers 112a is extended to the edge (e.g. side surface) of the photonic integrated circuit 110a as shown in FIG. 11 and FIG. 13. In some embodiments, an extending direction of each of the edge couplers 112a is different from an extending direction of each of the grating couplers 112. With such arrangement, the optical fibers (optical I/O) 160a may be coupled to the photonic integrated circuit 110a from a side way as it is shown in FIG. 12 to form an edge coupling.

Figure 14:
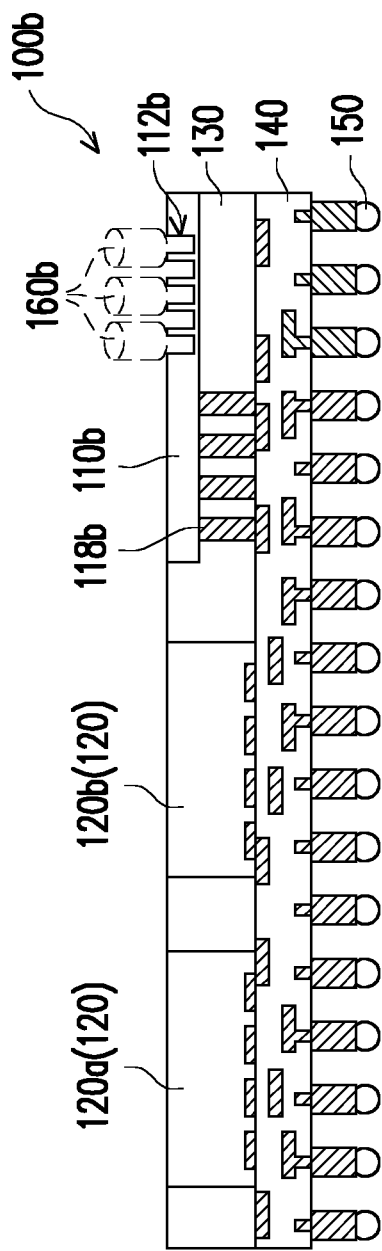
FIG. 14 illustrates a cross sectional view of an integrated optical communication system coupled to optical fibers according to some exemplary embodiments of the present disclosure.

FIG. 14 illustrates a cross sectional view of an integrated optical communication system coupled to optical fibers according to some exemplary embodiments of the present disclosure. It is noted that the integrated optical communication system 100b shown in FIG. 14 contains many features same as or similar to the integrated optical communication system 100 disclosed earlier with FIG. 9 and FIG. 10. For purpose of clarity and simplicity, detail description of same or similar features may be omitted, and the same or similar reference numbers denote the same or like components. The main differences between the integrated optical communication system 100b shown in FIG. 14 and the integrated optical communication system 100 shown in FIG. 9 and FIG. 10 are described as follows.

With now reference to FIG. 14, in some embodiments, the thickness of the photonic integrated circuit 110b is substantially smaller than the thickness of each of the electronic integrated circuits 120. With such arrangement, instead of having the through vias 118 (shown in FIG. 9) extending through the photonic integrated circuit 110b for electrical connection, a plurality of conductive pillars 118b may extend through the encapsulating material 130 located between the redistribution structure 140 and photonic integrated circuit 110b for connecting the photonic integrated circuit 110b and the redistribution structure 140. The encapsulating material 130 encapsulates the photonic integrated circuit and the conductive pillars 118b. That is to say, the conductive pillars 118b bridge the gap between the photonic integrated circuit 110b and the redistribution structure 140. Such arrangement can be applied to the embodiment of the optical couplers 112b being the grating couplers as shown in FIG. 14. Accordingly, the grating couplers 112b includes the grooves arranged within the upper surface of the photonic integrated circuit 110b as it is shown in FIG. 14. The optical couplers 112b are configured for coupling light into the photonic integrated circuit 110 from an optical device and into/out of the photonic integrated circuit 110 via the optical fibers (optical I/O) 160b and may be aligned at an angle substantially normal to the surface of the photonic integrated circuit 110 to form a grating coupling. It is noted that similar arrangement (bridging the gap with the conductive pillars 118b for electrical connection) may also applied to the electronic integrated circuits 120 when the thickness of either one of the electronic integrated circuits 120 is substantially smaller than other integrated circuits.

Figure 15:
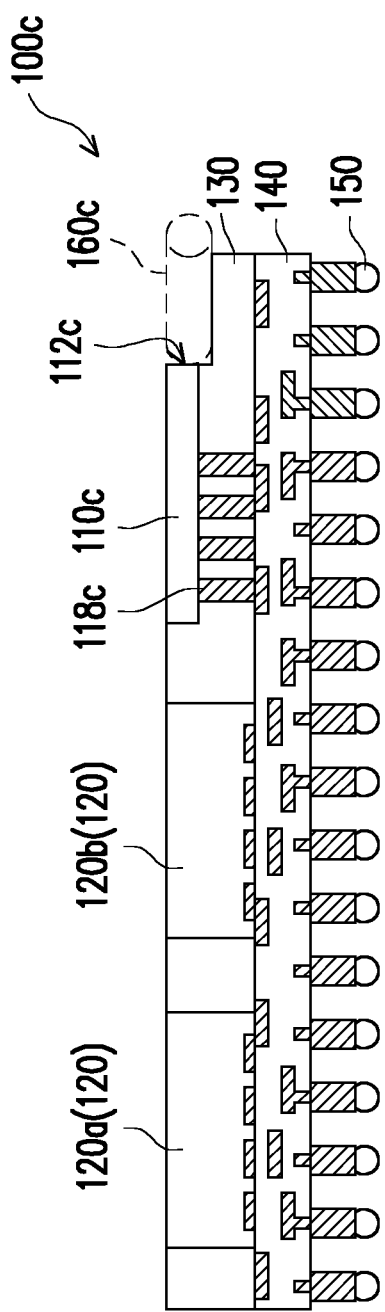
FIG. 15 illustrates a cross sectional view of an integrated optical communication system coupled to optical fibers according to some exemplary embodiments of the present disclosure.

FIG. 15 illustrates a cross sectional view of an integrated optical communication system coupled to optical fibers according to some exemplary embodiments of the present disclosure. It is noted that the integrated optical communication system 100c shown in FIG. 15 contains many features same as or similar to the integrated optical communication system 100 disclosed earlier with FIG. 9 and FIG. 10. For purpose of clarity and simplicity, detail description of same or similar features may be omitted, and the same or similar reference numbers denote the same or like components. The main differences between the integrated optical communication system 100c shown in FIG. 15 and the integrated optical communication system 100 shown in FIG. 9 and FIG. 10 are described as follows.

With now reference to FIG. 15, in some embodiments, the thickness of the photonic integrated circuit 110c is substantially smaller than the thickness of each of the electronic integrated circuits 120. With such arrangement, a plurality of conductive pillars 118c may extend through the encapsulating material 130 located between the redistribution structure 140 and photonic integrated circuit 110c for connecting the photonic integrated circuit 110c and the redistribution structure 140. The encapsulating material 130 encapsulates the photonic integrated circuit and the conductive pillars 118c. That is to say, the conductive pillars 118c bridge the gap between the photonic integrated circuit 110c and the redistribution structure 140. Such arrangement can be applied to the embodiment of the optical couplers 112c being edge couplers, which means the singularizing process is performed on a periphery of the photonic integrated circuit 110c along the scribe line. With such arrangement, after the singularizing process, the optical couplers 112c are partially cut and extended to an edge (e.g. side surface) of the upper surface of the photonic integrated circuit 110a as shown in FIG. 15. With such arrangement, the optical fibers (optical I/O) 160c may be coupled to the photonic integrated circuit 110c from a side way as it is shown in FIG. 15 to form an edge coupling.

In the embodiment of the thickness of the photonic integrated circuit 110c being substantially smaller than the thickness of each of the electronic integrated circuits 120, the optical couplers 112c may extend through the photonic integrated circuit 110c according to the size of the optical fibers (optical I/O) 160c. In the embodiment shown in FIG. 15, the thickness (diameter) of the optical fibers (optical I/O) 160c is substantially greater than the thickness of the photonic integrated circuit 110c. Accordingly, the grooves of the optical couplers 112c may extend through the photonic integrated circuit 110c and may even extend to a part of the encapsulating material 130 according to the thickness (diameter) of the optical fibers (optical I/O) 160c. It is noted that the center of the optical fibers (optical I/O) 160c may still face (align with) the photonic integrated circuit 110c. However, the exemplary example is merely for illustration and is not intended to limit the disclosure.

In sum, the integrated optical communication system of the disclosure is applied to an integrated fan-out structure and manufacturing method, which simplifies the complexity of conventional manufacturing process and reduces the production cost. In addition, the optical couplers are temporarily covered by the protection film during manufacturing process, so that issues of air bulge occurred in the optical couplers due to sequential high-vacuum processes such as a physical vapor deposition (PVD) process, a chemical vapor deposition (CVD) process, etc., can be avoided. Moreover, the protection film can be easily removed through a high-temperature thermal process and/or can be easily rinse off without any residual left on the optical couplers, so as to reduce the issue of cleanness of the optical couplers.

Based on the above discussions, it can be seen that the present disclosure offers various advantages. It is understood, however, that not all advantages are necessarily discussed herein, and other embodiments may offer different advantages, and that no particular advantage is required for all embodiments.

In accordance with some embodiments of the disclosure, a semiconductor package includes a photonic integrated circuit, an encapsulating material, and a redistribution structure. The photonic integrated circuit includes a coupling surface, a back surface opposite to the coupling surface and a plurality of optical couplers disposed on the coupling surface and configured to be coupled to a plurality of optical fibers. The encapsulating material encapsulates the photonic integrated circuit and revealing the plurality of optical couplers. The redistribution structure is disposed over the encapsulating material and the back surface of the photonic integrated circuit, wherein the redistribution structure is electrically connected to the photonic integrated circuit.

In accordance with some embodiments of the disclosure, an integrated optical communication system includes a photonic integrated circuit, at least one electronic integrated circuit, an encapsulating material, and a redistribution structure. The photonic integrated circuit includes a coupling surface and a plurality of optical couplers disposed on the coupling surface and configured to be coupled to a plurality of optical fibers. The at least one electronic integrated circuit is disposed with the photonic integrated circuit in a side by side manner. The encapsulating material encapsulates the photonic integrated circuit and the at least one electronic integrated circuit, wherein the encapsulating material reveals the plurality of optical couplers. The redistribution structure is disposed over the encapsulating material, the photonic integrated circuit and the at least one electronic integrated circuit, and located at a side opposite to the plurality of optical couplers, wherein the redistribution structure electrically connecting the photonic integrated circuit and the at least one electronic integrated circuit.

In accordance with some embodiments of the disclosure, a manufacturing method of an integrated optical communication system includes the following steps. A photonic integrated circuit and at least one electronic integrated circuit are provided on a carrier, wherein the photonic integrated circuit and the at least one electronic integrated circuit are disposed in a side by side manner, and the photonic integrated circuit comprises a plurality of optical couplers facing the carrier and covered by a protection film. An encapsulating material is provided on the carrier for encapsulating the photonic integrated circuit and the at least one electronic integrated circuit. A redistribution structure is provided over the encapsulating material and the back surface of the photonic integrated circuit, wherein the redistribution structure is electrically connected to the photonic integrated circuit and the at least one electronic integrated circuit. The carrier is removed. The protection film is removed for revealing the plurality of optical couplers. A singularizing process is performed to form a plurality of integrated optical communication systems.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor package, comprising:
    a photonic integrated circuit comprises a coupling surface, a back surface opposite to the coupling surface and a plurality of optical couplers disposed on the coupling surface and configured to be coupled to a plurality of optical fibers;
    an encapsulating material extending along sidewalls of the photonic integrated circuit and revealing the plurality of optical couplers, wherein the back surface of the photonic integrated circuit is substantially leveled with a top surface of the encapsulating material; and
    a redistribution structure being in contact with the top surface of the encapsulating material and the back surface of the photonic integrated circuit, wherein the redistribution structure is electrically connected to the photonic integrated circuit.

2. The semiconductor package as claimed in claim 1, wherein the plurality of optical couplers are grating couplers, which comprise a plurality of grooves parallel to one another.

3. The semiconductor package as claimed in claim 1, wherein the plurality of optical couplers are edge couplers, which comprise a plurality of grooves parallel to one another and extended to an edge of the coupling surface.

4. The semiconductor package as claimed in claim 1, further comprising at least one electronic integrated circuit disposed with the photonic integrated circuit in a side by side manner and encapsulated by the encapsulating material, wherein the redistribution structure disposed over and electrically connected to the electronic integrated circuit.

5. The semiconductor package as claimed in claim 1, wherein the at least one electronic integrated circuit comprises an application-specific integrated circuit (ASIC).

6. The semiconductor package as claimed in claim 1, wherein the photonic integrated circuit further comprises a plurality of through vias extending through the photonic integrated circuit for electrically connecting the coupling surface and the back surface.

7. The semiconductor package as claimed in claim 1, further comprising a plurality of conductive pillars, wherein the encapsulating material encapsulates the back surface of the photonic integrated circuit, and the plurality of conductive pillars extend through the encapsulating material for connecting the back surface of the photonic integrated circuit and the redistribution structure.

8. The semiconductor package as claimed in claim 7, wherein the plurality of optical couplers extend through the photonic integrated circuit.

9. An integrated optical communication system, comprising:
   a photonic integrated circuit comprises a coupling surface and a plurality of optical couplers disposed on the coupling surface and configured to be coupled to a plurality of optical fibers;
   at least one electronic integrated circuit disposed with the photonic integrated circuit in a side by side manner;
   an encapsulating material extending along sidewalls of the photonic integrated circuit and sidewalls of the at least one electronic integrated circuit to separate the photonic integrated circuit from the at least one electronic integrated circuit, wherein the encapsulating material reveals the plurality of optical couplers, and a back surface of the photonic integrated circuit and an active surface of the at least one electronic integrated circuit are substantially leveled with a top surface of the encapsulating material; and
   a redistribution structure being in contact with the top surface of the encapsulating material, the back surface of the photonic integrated circuit and the active surface of the at least one electronic integrated circuit, and located at a side opposite to the plurality of optical couplers, wherein the redistribution structure electrically connecting the photonic integrated circuit and the at least one electronic integrated circuit.

10. The integrated optical communication system as claimed in claim 9, wherein the plurality of optical couplers are grating couplers, which comprise a plurality of grooves parallel to one another.

11. The integrated optical communication system as claimed in claim 9, wherein the plurality of optical couplers are edge couplers, which comprise a plurality of grooves parallel to one another and extended to an edge of the coupling surface.

12. The integrated optical communication system as claimed in claim 9, wherein the at least one electronic integrated circuit comprises an application-specific integrated circuit (ASIC).

13. The integrated optical communication system as claimed in claim 9, wherein the photonic integrated circuit further comprises a plurality of through vias extending through the photonic integrated circuit.

14. The integrated optical communication system as claimed in claim 9, further comprising a plurality of conductive pillars, wherein the encapsulating material encapsulates the photonic integrated circuit, and the plurality of conductive pillars extend through the encapsulating material for connecting the photonic integrated circuit and the redistribution structure.

15. The integrated optical communication system as claimed in claim 9, wherein the plurality of optical couplers extend through the photonic integrated circuit.

16. A manufacturing method of an integrated optical communication system, comprising:
   providing a photonic integrated circuit and at least one electronic integrated circuit on a carrier, wherein the photonic integrated circuit and the at least one electronic integrated circuit are disposed in a side by side manner, and the photonic integrated circuit comprises a plurality of optical couplers facing the carrier and covered by a protection film;
   providing an encapsulating material on the carrier for encapsulating the photonic integrated circuit and the at least one electronic integrated circuit;
   providing a redistribution structure over the encapsulating material, the photonic integrated circuit, and the at least one electronic integrated circuit, wherein the redistribution structure is electrically connected to the photonic integrated circuit and the at least one electronic integrated circuit;
   removing the carrier;
   removing the protection film for revealing the plurality of optical couplers; and
   performing a singularizing process to form a plurality of integrated optical communication systems.

17. The manufacturing method of the integrated optical communication system as claimed in claim 16, wherein the singularizing process is performed on the encapsulating material, and the plurality of optical couplers after the singularizing process are grating couplers comprising a plurality of grooves arranged within an upper surface of the photonic integrated circuit.

18. The manufacturing method of the integrated optical communication system as claimed in claim 16, wherein the singularizing process is performed on a periphery of the photonic integrated circuit and the plurality of optical couplers after the singularizing process are edge couplers comprising a plurality of grooves extended to an edge of an upper surface of the photonic integrated circuit.

19. The manufacturing method of the integrated optical communication system as claimed in claim 16, wherein the protection film is removed by a thermal process and/or a rinse process.

20. The manufacturing method of the integrated optical communication system as claimed in claim 16, further comprising:
   mounting a plurality of conductive balls on the redistribution structure; and
   disposing the plurality of the conductive balls on a tape carrier before the carrier is removed.

* * * * *